United States Patent [19]

Itozawa

[11] Patent Number: 4,748,080

[45] Date of Patent: May 31, 1988

[54] MAGNETIC RECORDING MEDIUM CONTAINING IRON CARBIDE

[75] Inventor: Kenji Itozawa, Hino, Japan

[73] Assignee: Konishiroku Photo Industry Co., Ltd., Tokyo, Japan

[21] Appl. No.: 913,954

[22] Filed: Oct. 1, 1986

[30] Foreign Application Priority Data

Oct. 8, 1985 [JP] Japan .................................. 60-225647
Mar. 17, 1986 [JP] Japan .................................. 61-61197
Mar. 17, 1986 [JP] Japan .................................. 61-61198
Mar. 17, 1986 [JP] Japan .................................. 61-61199

[51] Int. Cl.$^4$ .............................................. G11B 5/714
[52] U.S. Cl. .................................. 428/328; 252/62.54; 427/128; 428/694; 428/900; 428/329; 428/698
[58] Field of Search ................ 427/131, 128; 428/695, 428/329, 328, 694, 900, 425.9, 698; 252/62.54; 360/134–136

[56] References Cited

U.S. PATENT DOCUMENTS

| | | | |
|---|---|---|---|
| 4,137,361 | 1/1979 | Deffeyes | 428/328 |
| 4,218,507 | 8/1980 | Deffeyes | 428/328 |
| 4,347,165 | 8/1982 | Matheson | 428/328 |
| 4,554,217 | 11/1985 | Grimm | 428/469 |
| 4,632,866 | 12/1986 | Kubota | 428/900 |

Primary Examiner—Ellis P. Robinson
Attorney, Agent, or Firm—Jordan B. Bierman

[57] ABSTRACT

A magnetic recording medium containing iron carbide is disclosed. Iron carbide shows electric conductivity and low light transmission. Therefor an antistatic property and light shielding ability of the medium are improved. Iron carbide is contained in the magnetic layer of the medium in combined with the other ferromagnetic materials such as Co-adhered-$\gamma$-Fe$_2$O$_3$ or hexagonal ferrite. An amount of iron carbide in the magnetic layer is within the range of from 1.5 to 15% of the magnetic layer by volume.

4 Claims, 1 Drawing Sheet

MAGNETIC RECORDING MEDIUM CONTAINING IRON CARBIDE

FIELD OF THE INVENTION

The invention relates to a magnetic recording medium superior in electrical conductivity, light shielding performance, and image reproduction output.

BACKGROUND OF THE INVENTION

Conventionally, $\gamma$-$Fe_2O_3$, co-adhered $\gamma Fe_2O_3$ and the like have been used as magnetic powders. The sizes of the above-described recently manufactured powders have been made smaller and smaller to increase S/N. Besides the above-described powders, Ba-ferrite and metal powder have been used to effect high density recording.

In order to meet the requirements of high densified magnetic recording, a spread-coating type magnetic layer, in which magnetic powder is dispersed in a binder, was first used, and then, a thin metal magnetic layer, processed by means of evaporating or sputtering magnetic material was put into use. Next instead of the conventional horizontal recording method as abovementioned, a vertical recording method was adopted because this method enables the demagnetizing factor to approach zero.

In the above-described vertical recording method, a vertical head as well as magnetic material has been developed and magnetic layer formation method has also been made; that is, a Co-Cr magentic layer formation method was carried out at the initial stage, however, recently, vacuum deposition, metal plating, and spread-coating methods have been developed.

Hexagonal class ferrites, whose magnetic axes are perpondicular to crystal faces have been recently used as a material for spread-coating method. The above-described hexagonal ferrites are represented by Ba ferrite of the Co-Ti-substitution type.

The combined use of hexagonal ferrite and Co-$\gamma$-$Fe_2O_3$ was proposed, in Japanese patent publication Open to Public Inspection No. 212623/1982 (hereinafter referred to as Japanese patent O.P.I. publication), so that hexagonal ferrites may increase their reproduction output. Use of Ba ferrites mixed with metal powders selected from the iron group is also proposed to make output power go higher at low frequencies because simply using Ba ferrite is insufficient for improving reproduction output at low frequencies.

It is necessary for a magnetic recording medium to have preferable magnetic properties as well as preferable anti-static properties from the viewpoint of use and handling. It is also necessary for the magnetic recording medium equipped in an instrument to exhibit high performance in light shielding when subjected to light transmitted from a sensor.

It is preferable that the electrical surface resistance of a magnetic recording medium be not more than $10^{10}$ $\Omega/cm^2$ and that the transmission of light be not more than 0.1% when light having a wave length of 900 nm is applied to a magnetic layer which is 4 $\mu$m thick.

The above-described $\gamma$-$Fe_2O_3$, Co-adhered $\gamma Fe_2O_3$, Ba ferrite, and hexagonal ferrite have poor electrical conductivity and light shielding, and magnetic recording medium consisting of the above-described magnetic powders are susceptible to electrical charges, and their light transmission ratio is high. Magnetic powders recently manufactured is very fine, which increases the above-described characteristics. Commonly, carbon black is added to a magnetic recording medium as an anti-static and a light shielding agent which lowers light transmission ratio. Using a large amount of carbon black, however, causes reduction in the percentage of magnetic powders contained in a magnetic recording medium, thereby greatly reducing its reproduction output.

There is disclosed in Japanese patent O.P.I. publication No. 124023/124023 a magnetic layer containing iron carbide as its main substance.

A magnetic layer which contains large quantities of iron carbide exhibits preferable electrical conductivity and light shielding performance. Material for iron carbide is costly because iron carbide is manufactured by carbonizing acicular iron oxide and iron oxy hydroxide, and moreover, shape of iron carbide particle is not uniform. Accordingly, a magnetic poweder consists of soley iron carbide is costly and its S/N does not attain required Bm (maximum magnetic flux density) levels.

A magnetic layer using metal powder is also low in electrical conductivity because a dense oxide film is usually formed on its surface in order to increase its chemical stability, and in addition, the size of metal powder to be used as a material for a magnetic layer is, in most case, fine.

SUMMARY OF THE INVENTION

It is the object of the invention to provide a magnetic recording medium which exhibits preferable anti-static and light shielding performance, and an image reproduction output in a significant degree.

The above-described object is attained by a magnetic recording medium comprising a support and a magnetic layer, provided thereon, comprising a binder and ferromagnetic materials, in which the magnetic layer contains iron carbide from 1.5 to 15% of the magnetic layer by volume.

Figure 1:
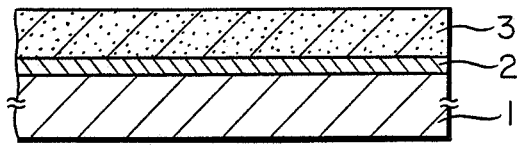
FIGS. 1 and 2 are cross-sectional views showing examples of a magnetic recording medium according to the invention.

DETAILED DESCRIPTION OF THE INVENTION $\gamma Fe_2O_3$, Co-adhered $\gamma Fe_2O_3$, Ba ferrite and the like are commonly used as magnetic materials. It is necessary to add large quantities of carbon black to a magnetic layer so that the electrical surface resistances of Ba ferrite and Co-adhered $\gamma Fe_2O_3$, to be used according to the invention, is not more than $10^{10}$ $\Omega/cm^2$, and the light transparency is not more than 0.1% when a light, whose wave length is 900 nm, is applied to a magnetic layer which is 4 $\mu$m thick. The percentage by volume of carbon black to be contained in a magnetic layer is 5 to 15 depending on the type of magnetic powder, carbon black, and binders to be used. The percentage by volume of a magnetic powder to be contained in a magnetic layer is commonly 30 to 50, so that the reproduction output can be increased by replacing carbon black with the magnetic powder. The invention has solved the problems of electro-static charges as well as light transmission by using iron carbide as a magnetic powder. Further, iron carbide provides a similar effect on charge preventing or light transmission with smaller volumetric content than that of carbon black, thus making the magnetic recording medium according to the invention less expensive.

Furthermore, the invention provides a highly durable magnetic layer because the rate of a binder which is to be contained in the magnetic layer can be increased by reducing the amount of carbon black without causing a decrease in its reproduction output owing to the replacement of part of the magnetic powder with iron carbide.

According to the invention, the preferable volume percentage of iron carbide to be contained in a magnetic layer is not less than 1.5%, and more preferably, not less than 2%. The object of the invention can be attained if the volume percentage of iron carbide is over the content range in accordance with the invention, however, the above-described disadvantage occurs. The characteristic properties of a magnetic layer are not improved even if the content of iron carbide therein is over 15 vol %. Only the cost for manufacture is expensive. Accordingly, the content of iron carbide in a magnetic layer preferably ranges from 1.5 to 15 vol %, and more preferably, from 2 to 15 vol %.

The content of iron carbide which is to be included in a magnetic layer is applied to a magentic tape, a magnetic disk, and the like.

Iron carbide used in this invention is represented $Fe_nC$ ($n \geq 2$), which mainly comprises $Fe_5C_2$ and $Fe_{20}C_9$, $Fe_3C$ and $Fe_2C$ may also be contained. Besides iron, other elements such as Co, Ni, Al, Zr, Cr, and Si may be included in the iron carbide also.

What follows are the preferable characteristics of iron carbide as a magnetic material: specific surface area in terms of BET; 35 $m^2/g$, saturation magnetization; 75-125 emu/g, average particle diameter of the direct axis: 0.05 to 0.3 $\mu$m.

Iron carbide is chemically stable. Further, it is sufficiently hard enough to allow a reduction in the amount of $\alpha$-$Al_2O_3$ which is to be added to the iron carbide as an abrasive, and it can be manufactured directly from oxyiron hydroxide.

As described above, the composition of the magnetic recording medium utilizes the above-described characteristics of iron carbide.

Improving S/N requires making a magnetic material fine (to enlarge specific surface area), however, convention metal magnetic powders can be used by making them very fine. For example, when they are used to make video tape, they are made very fine so that its specific surface area is more than 35 $m^2/g$ in BET value. As a result, the Hc (coersive force) value of the magnetic powder is too high. The inventor found that an iron carbide powder according to the invention, which is as fine as conventional magnetic powder can make the Hc value of the magnetic powder much lower when compared with conventional magnetic powders. Specifically, the Hc value of the magnetic powder is as low as 500 to 1,600 Oe (preferably from 600 to 1,600) when the specific surface area of the iron carbide, which is used according to the invention, is more than 35 $m^2/g$, and thus, a magnetic powder having a high reproduction output and appropriate Hc value is obtained. One of the characteristic features of the iron carbide according to the invention is that its $\sigma$ s (saturation magnetization) is set in a specific range, from 75 to 125 emu/g. If $\sigma$ s is less than 75 emu/g, the maximum magnetic flux density (Bm) of a magnetic recording medium is less than 2,000 Gauss, which is non-preferable. On the other hand, if $\sigma$ s is over 125 emu/g, the iron carbide exhibits an activity similar to metal powder; namely, instability, which means it catches fire easily. In view of the above, the preferable $\sigma$ s of magnetic material ranges from 75 to 125 emu/g (preferably 75~125 emu/g), which is lower than that of conventional magnetic metal.

As described above, a high reproduction output is generated from iron carbide owing to a preferable Hc and $\sigma$ s. It is to be noted that an apropriate size of magnetic material must be determined: that is, if the diameter of the powder is large, loud noise is generated and the magnetic layer surface becomes irregular, and thus, reproduction output, generated from a magnetic recording medium, which attains a high Bm is difficult to obtain. A magnetic material according to the invention is capable of preventing the above-described phenomina because, as described above, the specific surface area of a magnetic material is great, i.e., more than 35 $m^2/g$, and the average poweder diameter (major axis) ranges from 0.05 $\mu$m to 0.3 $\mu$m (preferably from 0.05 $\mu$m to 0.25 $\mu$m). The specific major axis of a magnetic material is less than 0.3 $\mu$m, and thus, a low noise is generated, produceing a high reproduction output. If the major axis of a magnetic material is less than 0.05 $\mu$m, sintering frequently occurs during manufacturer, making it difficult to produce uniform magnetic powder sizes and a uniform dispersion of magnetic powder in the magnetic layer.

Iron carbide, which is used in the invention, may be pure or other magnetic substances (iron oxide, e.g., $\gamma$-$Fe_2O_3$) may be contained in a magnetic material.

A magnetic material according to the invention is manufactured by contacting acicular iron oxyhydroxide or needlelike iron oxide, with CO gas or a gas mixture of CO and $H_2$. Preferable acicular iron oxyhydroxides include acicular $\gamma$-$Fe_2O_3$ (goethite) and $\gamma$-FeOOH (lepidocrocite). Preferable acicular iron oxides include acicular $\gamma$-$Fe_2O_3$ (maghemite) and acicular $\gamma$-$Fe_3O_4$ (magnetite).

"Specific surface area", as described above means surface area per unit weight, which is quite different in physical quantity from average powder diameter, for example, even if powders have the same average diameter, their specific surface area can differ. One example of measuring specific surface area is first to heat magnetic powders at approximately 250° C. for 30 to 60 minutes to deserate it so that adsorbates on the above-described magnetic powders are removed therefrom. Thereafter, the magnetic powders are introduced into a measuring device. Thereafter, the initial pressure of nitrogen is set to 0.5 $kg/m^2$, and then, an adsorption measurement is conducted by means of nitrogen at liquid nitrogen temperature ($-195°$ C.) (this specific surface area measuring method is called the B.E.T. method. Refer to J. Ame. Chem. Soc. 60 309 (1938) for detailed information). A "Granule measuring apparatus (Quantasorb)" manufactured by the Yuasa Battery Co., Ltd., in cooperation with Yuasa Ionics Co., Ltd. may be used to the measure specific surface area according to the above-described method. Specific surface area and the measuring method therefor is described in detail in "The Powder Measurement", written by J. M. DALLAVALLE and CLYDEORR Jr, translated by Mr. Benda and others, and published by Sangyotosho, and also described in the "Chemistry Handbook" (Application editing, item 1170~1171, edited by the Chemistry Society of Japan published by the Maruzen Co., Ltd. on Apr., 30, 1966). In the "Chemistry Handbook" specific surface area is described as surface area (m²/g), however, it means specific surface area.

As magnetic materials used in combination with iron carbide according to the invention include magnetic materials comprising oxide such as $\gamma$-Fe$_2$O$_3$, Co-contained $\gamma$-Fe$_2$O$_3$, Co-adhered $\gamma$-Fe$_2$O$_3$, Fe$_3$O$_4$, Co-contained Fe$_3$O$_4$, Co-adhered Fe$_3$O$_4$, CrO$_2$, hexagonal class ferritos. Metal powders including principally any one or two or all of the Fe, Ni, and Co such as Fe-Ni alloy, Fe-Co alloy Fe-Ni-P alloy, Fe-Ni-Co alloy, Fe-Mn-Zn alloy, Fe-Ni-Zn alloy, Fe-Co-Ni-Cr alloy, Fe-Co-Ni-P alloy, Co-Ni alloy, Co-P alloy, and Co-Cr alloy are noted. Of the above, Co-adhered $\gamma$-Fe$_2$O$_3$ and hexagonal ferrite are most preferable.

Additives to the above-described magnetic metal materials include elements such as Si, Cu, Zn, Al, P, Mn, Cr, and compounds of the above-described elements and iron nitride.

The preferable mixing weight ratio of iron carbide to Co-adhered $\gamma$-Fe$_2$O$_3$ ranges from 4:96 to 50:50.

A mixture of Co-adhered iron oxide and iron carbide mixed at the ratio of 96 to 4 by weight exhibits a preferable electrical surface resistance and light transparency. If the mixing ratio of iron carbide exceeds 50%, efficiency in electrical surface resistance and light transmissionn in the mixture is not improved, therefore, increasing the weight ratio of iron carbide is not preferable from the standpoint of cost savings.

Hexagonal ferrites which are applied to a magnetic recording medium are described hereinafter.

The general formula of hexagonal system ferrites which are used in the invention are indicated as follows:

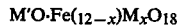

$$M'O \cdot Fe_{(12-x)}M_xO_{18}$$

According to the invention, they are applied to the above-described horizontal and vertical recording methods. In the general formula above, M' represents bivalent metals such as Ba, Sr, Pb and the like, and M represents at least one metal or a combination of In, Co-Ti, Co-V, Zn-Ge, Zn-Nb, and Zn-V, and X is an integer $3 \geq x \geq 0$.

According to the invention, the mixing weight ratio of hexagonal ferrite to iron carbide ranges from 95/5 to 55/45. If it is 95/5, a preferable light shielding performance is obtained and in the case of 90/10, the electrical surface resistance of a mixture is very low.

Iron carbide conducts electricity and shields light more efficiently than carbon black as compared an amount of iron carbide with an amount of carbon black to be used in order to obtain the same light shielding property and electric conductivity, the former can raise the packing density of magnetic powder more than the latter and eliminate the troubles of the carbon black to enable to obtain a relatively high reproduction output in both regions of high and low frequencies. Reproduction output is not enhanced in higher frequencies if the weight ratio of iron carbide to hexagonal ferrite is over 55 in relation to hexagonal ferrite.

Carbon black may be used in combination with iron carbide for a magnetic recording medium, according to the invention.

It is preferable to provide a back coat layer when carbon black is used. Carbon black may be contained either in a magnetic layer or a back coat layer or in both layers in a required quantity.

The running property and durability of a magnetic recording medium can be dramatically improved if small amounts of carbon black have a specific BET value and oil absorption. It is preferable for carbon black to have not more than 50 m²/g in BET value and not more than 400 cc/g in oil absorption, or 50 to 500 m²/g in BET value and 150 to 400 cc/g in oil absorption. The most preferable BET value and oil absorption of carbon black is not more than 50 m²/g and 150 to 400 cc/g, respectively.

The preferable amount of carbon black which is added to a magnetic powder ranges from 0.1 to 5 percent by weight.

Figure 2:
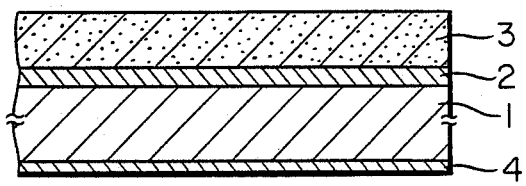

FIG. 1 shows a magnetic recording medium in which a magnetic material according to the invention is used, namely, a magnetic tape. In this magnetic tape, a magnetic layer 3 is piled on an under-coating layer 2 (this layer may or may not be provided, as necessary) under which a substrate 1 is provided. The above-described magnetic powder of the iron carbide according to the invention, is contained in the magnetic layer 3. In FIG. 2, a back coat layer 4 is provided under the substrate 1.

Polyurethane having abrasion resistance is used as a binder for use in a magnetic layer or a back coat layer according to the Invention. It strongly adheres to other materials, and is mechanically strong against repeated stress or flexing. Further, its abrasion and weather resistances are preferable.

An inclusion of cellulose resin and copolymer of chloroethylene in addition to polyurethane in a magnetic or back coat layer improves dispersibility of magnetic powders in a magnetic layer, thereby increasing the mechanical strength of the magnetic layer. The magnetic layer is hardened only by the addition of a resin of cellulose class and a copolymer of chloroethylene, however, such a phenomenon can be prevented by the addition of polyurethane.

Cellulose resins which can be used as binders according to the invention include, for example, cellulose ether, cellulose inorganic acid ester, and cellulose organic acid ester. The above-described chloroethylene copolymers may be partially hydrolyzed before being contained in a magnetic layer. A preferable copolymer of the chloroethylene may be selected from copolymers which contain chloroethylene-vinyl acetate.

Other available binders, according to the invention, are phenoxy resins. They are mechanically strong and not stable susceptible in dimension. Moreover, they are heat, water, and chemicals resistant and very adhesive.

The above-described advantages of phenoxy resins offset the disadvantages of polyurethane and vice versa so that its addition further increases the age stability of a magnetic recording tape.

In addition to the above-described binders, other binders may be used. They are resins which are usually used for a magnetic recording medium, various kinds of resins modified by hydrophilic group, and mixtures of thermoplastic resins having peculiar behavier, heat-hardening resin, reaction-type resins and electron beam irradiation-hardening resins.

An inclusion of various kinds of curing agents such as isocyanate may be added in magnetic paint to improve the durability of a magnetic recording tape according to the invention.

Available aromatic isocyanates include tolylene diisocyanate (TDI) and addition product containing isocyanate and active hydrogen compounds. Their preferable average molecular weights range from 100 to 3,000.

As the preferable aliphatic isocyanates, hexamethylenedisocyanate (HMDI) and the like or addition product of the above-described isocyanates and active hydrogen compounds are noted. Preferably, the molecular weights of the aliphatic isocyanates and the addition product range from 100 to 3,000. The non-alicyclic isocyanates and addition product of the compounds containing the non-alicyclic isocyanates and active hydrogen compounds are the most preferable aliphatic isocyanates.

Dispersants, lubricant, abrasives, mat materials, and additives, such as carbon black anti-static agents, may be contained in magnetic paints, as necessary, which are used to form the above-described magnetic layer.

The dispersants which are used in the invention include lecitin, phosphate, amine compounds, alkyl sulfate, fatty acid amide, higher alcohol, polyethylene oxide, sulfosuccinic acid, sulfosuccinate, a surface active agent known in the art, the salt thereof, and salt of polymer dispersing agents having negative organic groups (for example, —COOH, —PO$_3$H). Only one of these dispersants or combination thereof may be used. The rato of these dispersants added to magnetic particles is 1 to 20 in 100 parts by weight. These dispersants may be used for pretreating magnetic powders.

The lubricants which can be used are as follows: silicone oil, graphite, carbon black graft polymer, molybdenum disulfide, tungsten disulfide, lauryl acid, myristic acid, fatty acid ester (so-called wax) formed by condensation of monobasic aliphatic acid comprising 12 to 16 carbon atoms and a monohydric alcohol comprising 7 to 9 carbon atoms. These surface lubricants are added at the ratio of 0.2 to 20 parts by weight in 100 parts by weight of the magnetic particles.

Abrasives which are used according to the invention are conventional abrasives such as fused alumina, silicon carbide, chromium oxide, corundum, artifical corundum, diamond, artificial diamond, garnet, emery (main component: corundum and magnetite). The average powder diameters of these abrasives range from 0.05 to 5 μm. Most preferably, they are from 0.1 to 2 μm. The ratio of these abrasives added to range from 1 to 20 in 100 parts by weight of the magnetic particles.

As matting agents, organic powder or inorganic powder, or a mixture of them are used.

Preferable organic powders, which are used in the invention are, for example, acrylic styrene resins, benzoguanamine resin powder, melamine resin powder, phthalocyanine pigments. Other organic powders which can be used are for example, polyolefine resin powders, polyester resin powders, polyamide resin powder, polyimide resin powder, and polyethylene fluoride powder. Inorganic powders which can be used in the invention, for example, include silicon oxide, titanium oxide, aluminum oxide, calcium oxide, calcium carbonate, barium sulfate, zinc oxide, tin oxide, chrome oxide, silicon carbide, calcium carbide, $\alpha$-Fe$_2$O$_3$, talc, kaolin, calcium sulfate, boron nitride, zinc fluoride, molybdenum dioxide.

Anti-static agents which may be used include conductive powders such as above-described carbon black, graphite, tin oxide—antimony oxide class compound, titanium oxide—tin oxide class—antimony oxide compound.

The solvents which are applied to the above-described magnetic paints or the diluting solvents which are used when the magnetic paints are applied include ketonos such as acetone, methyl ethyl ketone, methyl isobutyl ketone, cyclohexanone; alcohols such as methanol, ethanol, propanol, butanol; esters such as methyl acetae, ethyl acetate, butyl acetate, ethyl lactate, ethylene glycol monoacetate, others such as glycol dimethyl ether, glycol monoethyl ether, dioxane, tetrahydrofuran; armomatic hydrocarbons such as benzene, toluene, xylene; and halogenated hydrocarbon such as methylene chloride, ethylene chloride, carbon tetrachloride, chloroform, dichlorobenzene.

Substrates which can be used according to the invention are selected from polyester class such as polyethylene terephthalate, polyethylene-2, 6-naphthalate; the polyolefin class such as polypropylene; cellulose derivative such as cellulose triacetate, cellulose diacetate; and plastics such as polyamide, polycarbonate. Metals such as Cu, Al, Zn and the lik; ceramic such as glass, BN Si carbide, porcelain, earthenware may be also used.

The thickness of these substrates vary depending on the type to be used; that is, about 3 to 100 μm in the case of films and sheets, preferably, 5 to 50 μm. In the case of disks and cards, the thickness ranges from 30 μm to 10 mm. These substrates are used in cylindrical shape when they are used for drum-shaped magnetic recording media, and needless to say, shape is determined by the magnetic recorders to which they apply.

An intermediate layer may be provided between a substrate and a magnetic layer.

The available methods for applying a magnetic layer onto a substrate include air doctor coating, blade coating, air knife coating, squeeze coating, impregation coating, reverse roll coating, transfer roll coating, gravure coating, kiss coating, cast coating, spray coating, however, not limited to these methods.

EXAMPLES

The examples of the invention are described hereinafter.

EXAMPLE 1

Preparation of Iron Carbide Power

Acicular goethite powders with different shapes and sizes were heat-treated at 350° C. for six hours in a gas mixture of carbon monoxide and nitrogen (mixing ratio: 30 to 70) to obtain the iron carbide powders shown in Table 1. These iron carbide powders can all be used for a magnetic recording medium according to the invention.

TABLE 1

| Magnetic powder | Hc (Oe) | $\sigma$s (emu/g) | BET (m$^2$/g) | Average particle diameter (μm) |
|---|---|---|---|---|
| P-1 | 950 | 82 | 47 | 0.18 |
| P-2 | 1100 | 100 | 50 | 0.15 |
| P-3 | 800 | 85 | 55 | 0.14 |
| P-4 | 1060 | 110 | 38 | 0.25 |
| P-5 | 920 | 77 | 60 | 0.08 |
| P-6 | 940 | 78 | 40 | 0.25 |
| P-10 | 700 | 98 | 40 | 0.20 |
| P-11 | 920 | 100 | 42 | 0.20 |

EXAMPLE 2

A magnetic paint was prepared at the following formula:

| | |
|---|---|
| Magnetic power | 100 parts by weight |
| Alumina | 5 parts by weight |

-continued

| | |
|---|---|
| Copolymer of chloroethylene and vinyl acetate | 11 parts by weight |
| Polyurethane | 11 parts by weight |
| Lecitin | 3.0 parts by weight |
| Lauric acid | 1.5 parts by weight |
| Butyl stearate | 1.0 parts by weight |
| Cyclohexanone | 100 parts by weight |
| Methyl ethyl ketone | 70 parts by weight |
| Toluene | 80 parts by weight |

Four parts by weight of TDI class isocyanate was added to this magnetic paint, and the maxture thus obtained was applied onto polyethylene terephtalate (PET) to form a layer with 4.4 μm of thickness when its dried and dried after orientation treatment. After it was dried, the surface was smoothed, and slitted to 12.65 mm of width. The magnetic powders used in this magnetic pain formation are as follows:

* Co-$\gamma$Fe$_2$O$_3$ (coersive force (Hc): 660 Oe, saturation magnetization ($\sigma$s): 77 emu/g, BET value: 35 m$^2$/g)
* Iron carbide (P-10 listed in Table 1) (Hc: 700 Oe, s: 98 emu/g, BET value: 40 m$^2$/g)

The X-RAY diffrection method identified the main component of the above iron carbide as Fe$_5$C$_2$.

The two magnetic powders above were mixed at the rate shown in Table 2 to obtain embodiment samples 1~6 and comparison samples 7~9.

TABLE 2

| Sample No. | Co-adhered Fe$_2$O$_3$ (parts by weight) | Iron carbide (parts by weight) | Vol % of iron carbide (%) | |
|---|---|---|---|---|
| 1 | 95 | 5 | 1.7 | Example |
| 2 | 90 | 10 | 3.4 | " |
| 3 | 90 | 10 | 3.4 | " |
| 4 | 80 | 20 | 6.8 | " |
| 5 | 70 | 30 | 10.3 | " |
| 6 | 55 | 45 | 15.0 | " |
| 7 | 97 | 3 | 1.0 | Comparison |
| 8 | 45 | 55 | 19.5 | " |
| 9 | 100 | 0 | 0 | " |

0.8 parts by weight of carbon black (BET value: 32 m$^2$/g, oil absorption: 180 cc/g) in 100 parts by weight of magnetic powder was added to sample 3, but not added to sample 2. Five parts by weight of carbon black (BET value: 220 m$^2$/g, oil absorption: 115 cc/100 g) in 100 parts by weight of magnetic powder was added to sample 8 in addition to the above-described treatment.

The result is shown in Table 3. Magnetic characteristics were measured by a vibrating sample magnetometer (VSM, manufactured by the Toei Kogyo Co.).

Light transmission were measured by applying light with a wave length of 900 nm.

TABLE 3

| | Bm (Gauss) | Video S/N (dB) | Light transmission factor (%) | Surface electrical resistance ($\Omega$/m$^2$) |
|---|---|---|---|---|
| 1 | 1730 | +1.5 | 0.1 | 5 × 10$^9$ |
| 2 | 1800 | +1.7 | 0.01 | 1 × 10$^9$ |
| 3 | 1780 | +1.5 | 0.009 | 1 × 10$^9$ |
| 4 | 1900 | +1.8 | 0.001 | 6 × 10$^7$ |
| 5 | 2020 | +1.9 | <0.001 | 5 × 10$^5$ |
| 6 | 2110 | +1.9 | <0.001 | <1 × 10$^5$ |
| 7 | 1710 | +1.4 | 0.9 | 7 × 10$^{11}$ |
| 8 | 2190 | 1.7 | <0.001 | <1 × 10$^5$ |
| 9 | 1520 | 0* | 0.12 | 2 × 10$^9$ |

*Standard of S/N (dB)

As stated above, magnetic paints which contain iron carhide reduces their light transmission, yet, magnetic paints containing more than 50 parts by weight of iron carbide are as effective as those containing a smaller quantity of iron carbide.

As apparent from the foregoing, remarkable reductions in light transmission factor and electrical surface resistance can be obtained in samples 1 through 6 in which iron carbide is contained more than 1.5 vol %. Magnetic powders which contain more than 15 vol % are not effective for reducing light transmission factor and electrical surface resistance. Sample 3, to which carbon black is added in small quantities, showed improvement in running property and durability.

EXAMPLE 3

In this example, the content of magnetic powders and their combined ratios were different from Example 2. Magnetic paints were prepared, however, in the same manner as in Example 2. The slitted width of samples was also 12.65 mm each. The magnetic powder used in this preparation are as follows:

* Co-Ti substitutet Ba ferrite (coersive force: 900 Oe; $\sigma$s: 58 emu/g; diameter: 0.06 μm: thickness; 0.02 μm)
* Iron carbide (sample P-11 prepared in embodiment 1, Hc: 9,200 Oe; $\sigma$s: 100 emu/g; BET value: 42 m$^2$/g)

The principal component of the iron carbide above was identified by X-RAY diffraction as Fe$_5$C$_2$.

These two magnetic powders were mixed at the ratio shown in Table 4 to obtain embodiment samples 11~14 and comparison samples 15~19, which were all magnetic tapes. The metal powder and Co-$\gamma$-Fe$_2$O$_3$ used in the comparative samples have the following characteristics:

* Metal powder: Hc: 1,000 Oe; $\sigma$s: 130 emu/g; BET value: 45 m$^2$g
* Co-adhered $\gamma$-Fe$_2$O$_3$; Hc: 840 Oe; $\sigma$s: 76 emu/g; BET value: 38 m$^2$/g

TABLE 4

| Sample No. | Ba ferrite (wt %) | Iron carbide (wt %) | Metal powder (wt %) | Co-adhered $\gamma$ Fe$_2$O$_3$ | Iron carbide vol % | |
|---|---|---|---|---|---|---|
| 11 | 93 | 7 | — | — | 2.6 | Example |
| 12 | 85 | 15 | — | — | 5.5 | " |
| 13 | 75 | 25 | — | — | 9.1 | " |
| 14 | 60 | 40 | — | — | 15.0 | " |
| 15 | 97 | 3 | — | — | 1.1 | Comparison |
| 16 | 50 | 50 | — | — | 18.8 | " |
| 17 | 100 | — | — | — | — | " |
| 18 | 85 | — | 15 | — | — | " |
| 19 | 85 | — | — | 15 | — | " |

Eight wt % of carbon black (BET vaue: 220 m$^2$/g; oil absorption 110 cc/100 g) was added to sample 17.

The result is shown in Table 5. The reproduction output was measured by inputting signals with a wave length of 0.75 μm and 3.8 μm. The light transmission was measured by applying light having a wave length of 900 nm.

The magnetic characteristics were measured by VSM aforementioned. The reproduction outputs are shown with relative values assuming the reproduction output of sample 17 is as 0 dB.

TABLE 5

|    | BM(Gauss) | 0.75 μm Reproduction output (dB) | 3.8 μm Reproduction output (dB) | Surface electrical resistance (Ω/cm$^2$) | Light transmission factor (%) |
|----|-----------|-----------------------------------|----------------------------------|------------------------------------------|-------------------------------|
| 11 | 1620      | +3.2                              | +3.0                             | $1 \times 10^{10}$                       | 0.1                           |
| 12 | 1720      | +3.1                              | +3.2                             | $3 \times 10^{8}$                        | 0.003                         |
| 13 | 1870      | +2.7                              | +3.4                             | $2 \times 10^{5}$                        | <0.001                        |
| 14 | 2100      | +2.4                              | +3.6                             | $<1 \times 10^{5}$                       | <0.001                        |
| 15 | 1570      | +3.2                              | +2.9                             | $>1 \times 10^{12}$                      | >1.0                          |
| 16 | 2190      | +1.4                              | +3.7                             | $<1 \times 10^{5}$                       | <0.001                        |
| 17 | 1390      | 0                                 | 0                                | $5 \times 10^{8}$                        | 0.1                           |
| 18 | 1820      | +2.9                              | +3.4                             | $>1 \times 10^{12}$                      | 0.01                          |
| 19 | 1670      | +3.6                              | +2.9                             | $>1 \times 10^{12}$                      | >1.0                          |

As shown in Table 5, the addition of iron carbide to magnetic powder improves electrical surface resistance and light transmission more than an addition of metal powder or Co-adhered γFe$_2$O$_3$. The addition also improves reproduction output more than an addition of carbon black. Furthermore, an addition of iron carbide is efficient for improving reproduction output in low frequency.

If iron carbide is added to magnetic powder beyond the mixture ratio in accordance with the invention, reproduction output is significantly lowered at high frequencies (short wave). On the other hand, if iron carbide is contained less than the quantity according to the invention, electrical surface resistance is not preferable.

What is claimed is:

1. A magnetic recording medium comprising a support having a magnetic layer thereon,
    said layer containing a binder and particles of a magnetic iron oxide and further containing iron carbide particles from 1.5 to 15% in volume to said layer,
    said iron carbide particles comprising an iron carbide represented by the formula Fe$_n$C wherein n is not less than 2 and,
    wherein a surface area in BET value, saturation magnetization, and average particle size measured along a long axis of said iron carbide particles are not less than 35 m$^2$/g, from 75 to 125 emu/g, and from 0.005 to 0.3 μm, respectively.

2. The magnetic recording medium of claim 1 wherein said magnetic iron oxide is selected from the group consisting of a γ-Fe$_2$O$_3$, a Co- containing γ-Fe$_2$O$_3$, a Co-adhered γ-Fe$_2$O$_3$, and a hexagonal ferrite.

3. The magnetic recording medium of claim 1, wherein said magnetic layer contains Co-adhered γ-Fe$_2$O$_3$ and iron carbide in the ratio from 96:4 to 50:50 by weight.

4. The magnetic recording medium of claim 2, wherein said magnetic layer contains hexagonal ferrite and iron carbide in the ratio from 95:5 to 55:45 by weight.

* * * * *